United States Patent Office 3,428,662
Patented Feb. 18, 1969

3,428,662
METHOD OF PREPARING METAL DIHYDROCARBYL DITHIOPHOSPHATES
Alfred J. Millendorf, Fishkill, and Frederick G. Oberender, Wappingers Falls, N.Y., assignors to Texaco Inc., New York, N.Y., a corporation of Delaware
No Drawing. Filed July 16, 1965, Ser. No. 472,689
U.S. Cl. 260—429.9                        1 Claim
Int. Cl. C07f 3/06, 9/02

ABSTRACT OF THE DISCLOSURE

A method of preparing oil soluble metal salts of dihydrocarbyl dithiophosphoric acid comprising contacting a hydroxy substituted aromatic hydrocarbon with $P_2S_5$ while simultaneously blowing the reaction mixture with an inert gas and then contacting the resultant diester dithiophosphoric acid with a metal carbonate at a temperature between about 30 and 140° F. under reduced pressure sufficient to permit the continuous distillation of water and subsequently raising the reaction temperature to between about 140 and 300° F. under said reduced pressure.

This invention pertains to a method of preparing oil soluble metal salts of dihydrocarbyl dithiophosphoric acid.

The oil soluble metal salts of diesters of dithiophosphoric acid contemplated within the scope of the invention have the general formula:

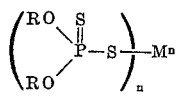

where R represents the hydrocarbyl group (monovalent hydrocarbon) of aryl or alkaryl of from 6 to 30 carbons, M represents a salt forming metal in Groups I, II, IV and VIII of the Periodic Table, e.g., nickel, lead, cadmium, zinc, magnesium, sodium, potassium, calcium, strontium, barium and $n$ is the valence of the metal portions of the salt. These dithiophosphates are well known anti-oxidant and corrosion inhibiting additives for lubricating oils.

The effectiveness of the metal dithiophosphate salts as anti-oxidants and corrosion inhibitors in lube oils are in large measure a direct function of the oil soluble phosphorus, sulfur and metal contents of these salt products. With this in view, one of the objects of the invention is to produce metal salts of diesters of dithiophosphoric acids having optimum oil soluble phosphorus, sulfur and metal contents. Another object is to shorten the reaction period necessary to produce these salts with the result of increased economics as well as increased anti-oxidant and corrosion inhibiting effectiveness.

In accordance with the foregoing objects, we have discovered and this constitutes our invention a method of producing in a reduced period of time metal salts of diesters of dithiophosphoric acid having optimum oil soluble metal, phosphorus and sulfur contents. More particularly, our invention comprises a two-stage reaction as follows:

FIRST STAGE

In the first stage a hydroxy substituted aromatic hydrocarbon of the formula:

ROH where R is as heretofore defined, is contacted with phosphorus pentasulfide ($P_2S_5$) at a temperature between about 250 and 300° F. under essentially anhydrous conditions for a period normally between about 3 to 5 hours utilizing a mole ratio of hydroxy compound to $P_2S_5$ of between about 3:1 and 6:1 to form the diester of dithiophosphoric acid of the formula:

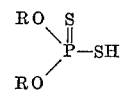

where R is as heretofore defined. During this entire first stage of the reaction an inert gas is advantageously blown through the reaction mixture, preferably at a rate of between about 0.005 and 0.025 standard cubic feet per hour (s.c.f.h.)/lb. reaction mixture, in order to remove volatiles such as hydrogen sulfide and water (if any).

Particularly critical features in this first stage of the process is maintenance of the reaction temperature above about 250° F. and maintenance of the reaction under essentially anhydrous conditions. Lower reaction temperatures inordinately increase the reaction time and produce dithiophosphoric acid intermediate products of undesirably reduced phosphorus and sulfur content. Further, if the reaction is not maintained under "essentially anhydrous" conditions the oil soluble phosphorus and sulfur contents of the acid product is also undesirably reduced.

By the term "essentially anhydrous" used hereinbefore and hereinafter we intend a water content less than about 0.2 wt. percent.

SECOND STAGE

The dihydrocarbon dithiophosphoric acid intermediate product recovered from the first stage is contacted under essentially anhydrous conditions with a metal carbonate or basic metal carbonate of the formula:

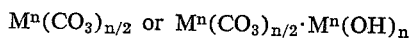

where M and $n$ are as heretofore defined at a first temperature between about 30 and 140° F., and preferably between about 90 and 110° F., under low enough subatmospheric pressure to permit the continuous removal of the water of reaction as formed while desirably simultaneously bubbling an inert gas through the reaction mixture to facilitate said removal. The pressure maintained in the second stage of the reaction is normally substantially below 760 mm. Hg, preferably less than 50 mm. Hg, and the inert gas rate is advantageously between about 0.005 and 0.025 s.c.f.h./lb. reaction mixture per hour. The ratio of moles of dithiophosphoric acid to the gram atoms of metal in the metal carbonate or basic metal carbonate is desirably between about 1.5:1 and 3:1. This reaction is normally conducted for a period of between about 1 and 4 hours whereupon the reaction temperature is raised to between about 200 and 250° F. and maintained for an additional period of time normally between about 1 and 5 hours, preferably the reduced pressure and inert gas blowing being continued.

One critical feature in the second stage of the reaction is the maintenance of the temperature below about 140° F. while removing water. To insure these anhydrous conditions, reduced pressure is necessary at about 140° F. and lower temperatures. If water is not continuously removed, it reacts with the unreacted dithiophosphoric acid and its metal salt product to decrease the amount of oil soluble metal, phosphorus and sulfur in the final metal salt product of the diester of dithiophosphoric acid. Further, even under essentially anhydrous conditions if the first temperature in the second stage is allowed to rise above about 140° F. in the initial phase of the reaction, the final metal salt products are of undesirably reduced oil soluble metal, phosphorus and sulfur content. The reason for this is that initial temperatures above about 140° F. will permit the formed water to react so rapidly that its essentially instantaneous removal is not soon enough to prevent reaction. Therefore, it is essential that the metal salt be substantially formed at a temperature below about 140° F. with the continuous removal of the bulk of the water of reaction, the final higher temperature merely insuring completion of the reaction.

Another critical feature in the second stage of the foregoing method of invention is the use of a metal carbonate. When a metal oxide or a metal hydroxide is substituted for the metal carbonate in the method of the invention, the oil soluble metal content as well as the oil soluble sulfur content of the dithiophosphate is substantially lower than when the metal carbonate is employed.

In the aforedescribed stages of the process inert liquid diluent may be employed to facilitate interaction of the reactants. A particularly suitable diluent is mineral lubricating oil of a viscosity between about 20 and 90 SUS at 210° F.

Purification of the dithiophosphoric acid intermediate and metal salt final product can be accomplished by standard means such as filtration, stripping and combinations thereof.

Examples of hydroxy substituted aromatic hydrocarbon reactants of the formula ROH contemplated herein are those hydroxylated hydrocarbons having between about 6 and 30 carbons such as phenol and alkylated phenol. More specific examples are phenol, 4-dodecylphenol, 4-tertiarybutylphenol, 2-methyl-4-octylphenol, 4-tertiaryoctylphenol, 2-decylphenol, 4-octadecylphenol and 4-dodecyl-2-methylphenol.

Specific examples of the metal carbonate reactants contemplated herein are zinc carbonate, basic zinc carbonate ($ZnCO_3 \cdot Zn(OH)_2$), barium carbonate, calcium carbonate, strontium carbonate, lead carbonate, nickel carbonate, magnesium carbonate and sodium carbonate.

Examples of the intermediate diester dithiophosphoric acid product reactants are di(phenyl) dithiophosphoric acid, di(4-dodecylphenyl) dithiophosphoric acid, di(4-tertiarybutylphenyl) dithiophosphoric acid, di(2-methyl-4-octylphenyl) dithiophosphoric acid, di(2-decylphenyl) dithiophosphoric acid, di(4-octadecyl) dithiophosphoric acid, and di(4-dodecyl-2-methylphenyl) dithiophosphoric acid.

Examples of the metal dithiophosphate salt final products contemplated herein are zinc di(phenyl) dithiophosphate, zinc di(4-dodecylphenyl) dithiophosphate, barium di(4-tertiarybutylphenyl) dithiophosphate, nickel di(2-methyl-4-octylphenyl) dithiophosphate, calcium di(4-tertiaryoctylphenyl) dithiophosphate, zinc di(2-decylphenyl) dithiophosphate, sodium di(4-octadecylphenyl) dithiophosphate, and magnesium di(4-dodecyl-2-methylphenyl) dithiophosphate.

Examples of the inert gases contemplated herein are nitrogen, argon and neon.

The following examples further illustrate the invention but are not to be taken as limitations thereof.

Example I

This example illustrates the preparation of the intermediate diester of dithiophosphoric acid.

To a 50 gallon vented, oil heated, stirred, stainless steel reactor there was charged at ambient (70° F.) temperature 125.0 pounds of 4-dodecylphenol, 21.4 pounds of phosphorus pentasulfide and 49.5 pounds of mineral lubricating oil (100 SUS at 100° F.). Nitrogen blowing of the resultant mixture was commenced at a rate of 2 s.c.f.h., and the reaction mixture was heated from ambient to 275° F. during a 3 hour period and maintained at 275° F. for an additional 4 hour period. A sample of the final product was analyzed and found to be a 74.4 wt. percent oil solution of di(dodecylphenyl) dithiophosphoric acid. Analysis of the product found: 3.4 wt. percent phosphorus, 6.4 wt. percent sulfur, and 60 Total Acid No.; theory: 3.1 wt. percent phosphorus, 6.4 wt. percent sulfur and 56 Total Acid No.

Example II

This example illustrates the conversion of the diester of dithiophosphoric acid into the metal salt.

To a 50 gallon, vented, oil heated, stirred, stainless steel reactor there was charged 185.0 pounds of di(dodecylphenyl) dithiophosphoric acid containing oil solution prepared in Example I together with 11.5 pounds of basic zinc carbonate and 0.003 pound of polydimethylsiloxane (1000 cs. at 77° F.) anti-foamant. The pressure over the reaction mixture was reduced to 20 mm. Hg and nitrogen blowing of the reaction mixture at 2 s.c.f.h. was commenced. The reaction mixture was heated and maintained in the range of 80–110° F. during a period of 2.5 hours and then the temperature was increased to 225° F. and maintained at that temperature for a period of 2 hours. At the end of the reaction period the final reaction mixture was filtered and the filtrate found to be a 75.2 wt. percent mineral oil solution of zinc di(dodecylphenyl) dithiophosphate of the formula:

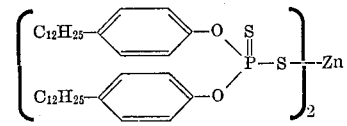

Analysis of the zinc dithiophosphate containing oil solution found: 3.0 wt. percent zinc, 3.1 wt. percent phosphorus, 6.0 wt. percent sulfur; theory: 3.1 wt. percent zinc, 3.0 wt. percent phosphorus and 6.2 wt. percent sulfur.

Example III

This example illustrates the importance of preparing the dithiophosphoric acid intermediate in the prescribed temperature range.

The overall procedure of Example I was essentially repeated in comparative test runs. The reaction conditions and results are reported below in Table I.

TABLE I

| | Runs | | | | Theory |
|---|---|---|---|---|---|
| | A | B | C | D | |
| Reactants: | | | | | |
| Dodecylphenol, lbs | 125.0 | 125.0 | 125.0 | 125.0 | |
| $P_2S_5$, lbs | 21.4 | 21.4 | 21.4 | 21.4 | |
| Mineral oil (100 SUS at 100° F.), lbs | 49.5 | 49.5 | 49.5 | 49.5 | |
| Reactant conditions: | | | | | |
| Temperature, °F | 225 | 275 | 275 | 275 | |
| Duration, hr | 7 | 3 | 4 | 7 | |
| Nitrogen, s.c.f.h | 2 | 2 | 2 | 2 | |
| Analysis of di(dodecylphenyl) dithiophosphoric acid oil solution: | | | | | |
| Phosphorus, wt. percent | 3.1 | 3.4 | 3.4 | 3.3 | 3.1 |
| Sulfur, wt. percent | 6.0 | 6.2 | 6.4 | 6.3 | 6.4 |
| TAN | 57 | 59 | 60 | 59 | 56 |

As can be seen from the foregoing, at 275° F. the intermediate product solution in a 3, 4 and 7 hour period had a higher oil soluble phosphorus, sulfur and total acid number (TAN) than the product solution produced at 225° F. at a 7 hour period. Further the temperature at 275° F. permitted the production of essentially the same product solution in 3 hours as produced at 7 hours thereby adding to the economy since shorter reaction periods may be employed.

Example IV

This example illustrates the importance of employing a metal carbonate.

The overall procedure of Example II was essentially employed in two comparative runs, one run utilizing a metal carbonate and the other run utilizing a metal oxide. The test data and results are reported below in Table II:

TABLE II

|  | Run E | Run F | Theory |
|---|---|---|---|
| Reactants, 2nd stage: |  |  |  |
| Di(dodecylphenyl) dithiophosphoric acid mineral oil solution, lbs.[1] | 185.0 | 145.0 |  |
| $ZnCO_3 \cdot Zn(OH)_2$, lbs | 11.5 |  |  |
| ZnO, lbs |  | 7.4 |  |
| Reactant conditions, 2nd stage: |  |  |  |
| 1st temperature, °F. (max.) | 110 | 110 |  |
| 2nd temperature, °F | 225 | 225 |  |
| Pressure, mm. Hg | 20 | 20 |  |
| Nitrogen, s.c.f.h. | 2 | 2 |  |
| Duration 1st temp., hrs | 2.5 | 2.5 |  |
| Duration 2nd temp., hrs | 2 | 2 |  |
| Analysis of zinc di(dodecylphenyl) dithiophosphate mineral oil solution: |  |  |  |
| Zinc, wt. percent | 3.0 | 1.4 | 3.1 |
| Phosphorus, wt. percent | 3.1 | 3.1 | 3.0 |
| Sulfur, wt. percent | 6.0 | 5.7 | 6.2 |

[1] 25 wt. percent mineral oil.

As can be seen from the foregoing, when zinc oxide even at 25% excess is employed (Run F) the product obtained is undesirably of a reduced oil soluble zinc and sulphur content, whereas the metal carbonate at 10% excess produces (Run E) a product of desirably a higher zinc and sulfur content, under the same reaction conditions.

Example V

This example illustrates the criticality of maintaining the initial reaction temperature in the second stage below about 140° F. and the reaction pressure under sufficient subatmospheric conditions to permit continuous removal of water of reaction during the conversion of the dithiophosphoric acid intermediate into the corresponding metal salt.

The overall procedure of Examples I and II were employed in several runs with reaction conditions being varied for comparative purposes. The test data and results are reported below in Table III:

TABLE III

|  | Run G | Run H | Theory |
|---|---|---|---|
| Reactants: |  |  |  |
| Di(dodecylphenyl) dithiophosphoric acid mineral oil solution, lbs.[1] | 185.0 | 185.0 |  |
| $ZnCO_3 \cdot Zn(OH)_2$, lbs | 11.5 | 11.5 |  |
| Reactant conditions: |  |  |  |
| 1st temperature, °F | 80–110 | 80–225 |  |
| 2nd temperature, °F | 225 | 225 |  |
| Pressure, mm. Hg | 20 | 760 |  |
| Nitrogen, s.c.f.h. | 2 | 2 |  |
| Duration 1st temp., hrs | 2.5 | 4 |  |
| Duration 2nd temp., hrs | 2 | 5 |  |
| Analysis of zinc di(dodecylphenyl) dithiophosphate oil solution: |  |  |  |
| Zinc, wt. percent | 3.0 | 3.1 | 3.1 |
| Phosphorus, wt. percent | 3.1 | 2.8 | 3.0 |
| Sulfur, wt. percent | 6.0 | 5.2 | 6.2 |

[1] 25 wt. percent mineral oil.

As can be seen from the foregoing, if the temperature and pressure in the conversion of the dithiophosphoric acid into the corresponding zinc salt is not maintained below critical levels in the initial phase of the reaction and water is not continuously removed, a final dithiophosphate product is formed of undesirably reduced oil soluble phosphorus and sulfur contents.

We claim:
1. A method of preparing zinc di(dodecylphenyl) dithiophosphate comprising:
   (1) contacting in the presence of a mineral lubricating oil diluent dodecylphenol with $P_2S_5$ at a temperature between about 250 and 300° F. while simultaneously blowing the reaction mixture with an inert gas in a mole ratio of said dodecylphenol to said $P_2S_5$ of between about 3:1 and 6:1 to form di(dodecylphenyl) dithiophosphoric acid, and
   (2) contacting said di(dodecylphenyl) dithiophosphoric acid in the presence of a mineral lubricating oil diluent with a basic zinc carbonate of the formula $ZnCO_3 \cdot Zn(OH)_2$ at a temperature between about 30 and 140° F. under a reduced pressure sufficient to permit the distillation of water, in a mole ratio of said dithiophosphoric acid to gram atoms of zinc in said basic zinc carbonate of between about 1.5:1 and 3:1, while simultaneously blowing the reaction mixture with an inert gas, and subsequently raising the reaction temperature to between about 140 and 300° F. under said reduced pressure and inert gas blowing, thereby forming said zinc di(dodecylphenyl) dithiophosphate.

References Cited

UNITED STATES PATENTS

| 2,342,572 | 2/1944 | Cook et al. | 260—439 XR |
| 2,362,624 | 11/1944 | Gaynor et al. | 260—987 XR |
| 2,364,283 | 12/1944 | Freuler | 260—981 XR |
| 2,410,650 | 11/1946 | Giammaria | 260—429.7 XR |
| 2,665,295 | 1/1954 | Augustine | 260—981 XR |
| 2,785,128 | 3/1957 | Popkin | 260—429.9 XR |
| 2,824,063 | 2/1958 | Verley | 252—32.7 |
| 2,838,557 | 6/1958 | Verley | 260—987 |
| 3,234,250 | 2/1966 | Schneider | 260—429.9 |
| 3,259,579 | 7/1966 | Rogers et al. | 260—981 XR |
| 3,290,347 | 12/1966 | Miller | 260—429.9 |
| 2,552,570 | 5/1951 | McNab et al. | 260—429.9 XR |

TOBIAS E. LEVOW, *Primary Examiner.*

H. M. S. SNEED, *Assistant Examiner.*

U.S. Cl. X.R.

252—32.7; 260—429, 429.3, 429.5, 430, 431, 438.1, 439, 981, 987